United States Patent
Cengarle et al.

(10) Patent No.: US 11,609,737 B2
(45) Date of Patent: Mar. 21, 2023

(54) HYBRID AUDIO SIGNAL SYNCHRONIZATION BASED ON CROSS-CORRELATION AND ATTACK ANALYSIS

(71) Applicant: DOLBY INTERNATIONAL AB, Amsterdam Zuidoost (NL)

(72) Inventors: Giulio Cengarle, Barcelona (ES); Antonio Mateos Solé, Barcelona (ES)

(73) Assignee: Dolby International AB, Amsterdam Zuidoost (NL)

( * ) Notice: Subject to any disclaimer, the term of this patent is extended or adjusted under 35 U.S.C. 154(b) by 374 days.

(21) Appl. No.: 16/617,186

(22) PCT Filed: Jun. 25, 2018

(86) PCT No.: PCT/EP2018/066898
§ 371 (c)(1),
(2) Date: Nov. 26, 2019

(87) PCT Pub. No.: WO2019/002179
PCT Pub. Date: Jan. 3, 2019

(65) Prior Publication Data
US 2021/0132895 A1    May 6, 2021

Related U.S. Application Data

(60) Provisional application No. 62/550,810, filed on Aug. 28, 2017.

(30) Foreign Application Priority Data

Jun. 27, 2017  (ES) ................................. P201730846
Aug. 28, 2017  (EP) ..................................... 17188117

(51) Int. Cl.
*G06F 3/16*        (2006.01)
*G10L 25/06*       (2013.01)
(Continued)

(52) U.S. Cl.
CPC .............. *G06F 3/165* (2013.01); *G10L 25/06* (2013.01); *G10L 25/60* (2013.01); *G11B 27/031* (2013.01)

(58) Field of Classification Search
CPC combination set(s) only.
See application file for complete search history.

(56) References Cited

U.S. PATENT DOCUMENTS 5,040,081 A    8/1991   McCutchen
7,142,579 B2  11/2006   Chou
(Continued)

FOREIGN PATENT DOCUMENTS

CN     1742492      3/2006
CN   102576524      7/2012
(Continued)

OTHER PUBLICATIONS

Crockett, B. et al "Next Generation Automotive Research and Technologies", presented at the 120th AES Convention, May 20-23, 2006, Paris, France.
(Continued)

*Primary Examiner* — Phung-Hoang J Nguyen

(57) ABSTRACT

Methods, systems, and computer program products for synchronizing audio signals captured by multiple independent devices during an audio event are described. Multiple recording devices, e.g. several smartphones, record the audio event. A computer system receives audio signals from the devices. The system determines a first delay between two audio signals based on cross-correlation of waveforms of the two audio signals. Subsequently, the system detects attacks that are present in each audio signal by computing the derivative of a respective envelope for each audio signal. The system determines a second delay between the two audio signals based on cross-correlation of attacks of the two audio signals. The system synchronizes the audio signals
(Continued)

using the second delay upon determining that using the second delay improves sound quality over using the first delay.

16 Claims, 8 Drawing Sheets

(51) Int. Cl.
*G10L 25/60* (2013.01)
*G11B 27/031* (2006.01)

(56) References Cited

U.S. PATENT DOCUMENTS

| | | | |
|---|---|---|---|
| 7,508,947 B2 | 3/2009 | Smithers | |
| 7,767,897 B2 * | 8/2010 | Jochelson | G10H 1/40 |
| | | | 84/649 |
| 8,158,870 B2 * | 4/2012 | Lyon | G06F 16/683 |
| | | | 379/88.01 |
| 8,780,209 B2 | 7/2014 | Wei | |
| 9,332,346 B2 | 5/2016 | Ojanperä | |
| 10,318,813 B1 * | 6/2019 | Pereira | G06F 16/48 |
| 2007/0192102 A1 * | 8/2007 | Kim | G10L 25/90 |
| | | | 704/E11.006 |
| 2012/0198317 A1 | 8/2012 | Eppolito | |
| 2013/0077805 A1 * | 3/2013 | Kirsch | H04N 21/8106 |
| | | | 381/119 |
| 2013/0121662 A1 | 5/2013 | Moorer | |
| 2014/0079372 A1 | 3/2014 | Zhang | |
| 2015/0120308 A1 * | 4/2015 | Leistikow | G10H 1/366 |
| | | | 704/500 |
| 2015/0310891 A1 | 10/2015 | Pello | |

FOREIGN PATENT DOCUMENTS

| | | |
|---|---|---|
| CN | 102968993 | 3/2013 |
| CN | 103077734 | 5/2013 |
| CN | 103621101 | 3/2014 |
| CN | 104183241 | 12/2014 |
| EP | 2573773 A2 | 3/2013 |
| EP | 1519363 B1 | 7/2013 |
| GB | 2226718 B | 7/1990 |
| WO | 2012098432 A1 | 7/2012 |
| WO | 2013064860 A1 | 5/2013 |
| WO | 2014072772 A1 | 5/2014 |
| WO | 2015116841 | 8/2015 |

OTHER PUBLICATIONS

Kammerl, J. et al "Temporal Synchronization of Multiple Audio Signals" IEEE International Conference on Acoustics, Speech and Signal Processing, May 4-9, 2014.

* cited by examiner

HYBRID AUDIO SIGNAL SYNCHRONIZATION BASED ON CROSS-CORRELATION AND ATTACK ANALYSIS

CROSS-REFERENCE TO RELATED APPLICATIONS

This application is U.S. National Stage of International Application No. PCT/EP2018/066898, filed Jun. 25, 2018, which claims priority of the following applications: ES patent application P201730846, filed Jun. 27, 2017; U.S. provisional application 62/550,810, filed Aug. 28, 2017; and EP application 17188117.0, filed Aug. 28, 2017, each of which is hereby incorporated by reference in its entirety.

TECHNICAL FIELD

This disclosure relates generally to audio signal processing.

BACKGROUND

Sound events like concerts or rehearsals may be recorded with multiple devices that are not temporally synchronized. For example, multiple members of an audience may record a concert with their respective smartphones. Multiple members of a band may record their respective performances with their devices placed close to their respective instruments. In these situations, each person may press a "record" button at a different time. In order to combine and mix these recordings, the recordings have to be synchronized such that the recordings are temporally aligned. Conventional synchronization is usually done manually or based on cross-correlation analysis of the audio signals, which returns time delays at which the signals are maximally aligned. The conventional synchronization requires that the signals to be aligned show a high degree of similarity.

SUMMARY

Techniques for synchronizing audio signals captured by multiple independent devices during an audio event are described. Multiple recording devices, e.g. several smartphones, record the audio event. A computer system receives audio signals from the devices. The system determines a first delay between two audio signals based on cross-correlation of waveforms of the two audio signals. Subsequently, the system detects attacks that are present in each audio signal by computing the derivative of a respective envelope for each audio signal. The system determines a second delay between the two audio signals based on cross-correlation of attacks of the two audio signals. The system synchronizes the audio signals using the second delay upon determining that using the second delay improves alignment quality over using the first delay.

The features described in this specification can achieve one or more advantages over conventional audio processing technology. Compared to conventional synchronization techniques, the disclosed techniques are more robust against effects of room reverberation, which may lead to timing errors in conventional synchronization. In situations when audio signals are dissimilar to one another, the disclosed techniques can handle synchronization better than conventional techniques can. For example, microphones may only pick up some of the instruments at a performance. Audio signals may include signals from keyboards only, or bass guitar only, etc., where ambient sound is not captured. These signals typically are challenging to conventional audio synchronization. The disclosed techniques can synchronize these signals more accurately.

The disclosed techniques improve upon conventional audio synchronization in that the disclosed techniques are capable of synchronizing audio signals that exhibit wide peaks or multiple peaks of similar amplitude in a cross-correlation function. The wide peaks or multiple peaks may lead to large uncertainties in the determination of relative delay. The disclosed techniques, synchronizing audio signals based on attacks rather than the peaks themselves, reduce the uncertainty. The disclosed techniques perform well even in circumstances where a same event is recorded with different recording devices that are located in different locations of the event. These devices may capture audio signals that hardly look similar by simple waveform inspection. The disclosed techniques can handle these signals better than conventional audio synchronization.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Example Recording Setup

Figure 1:
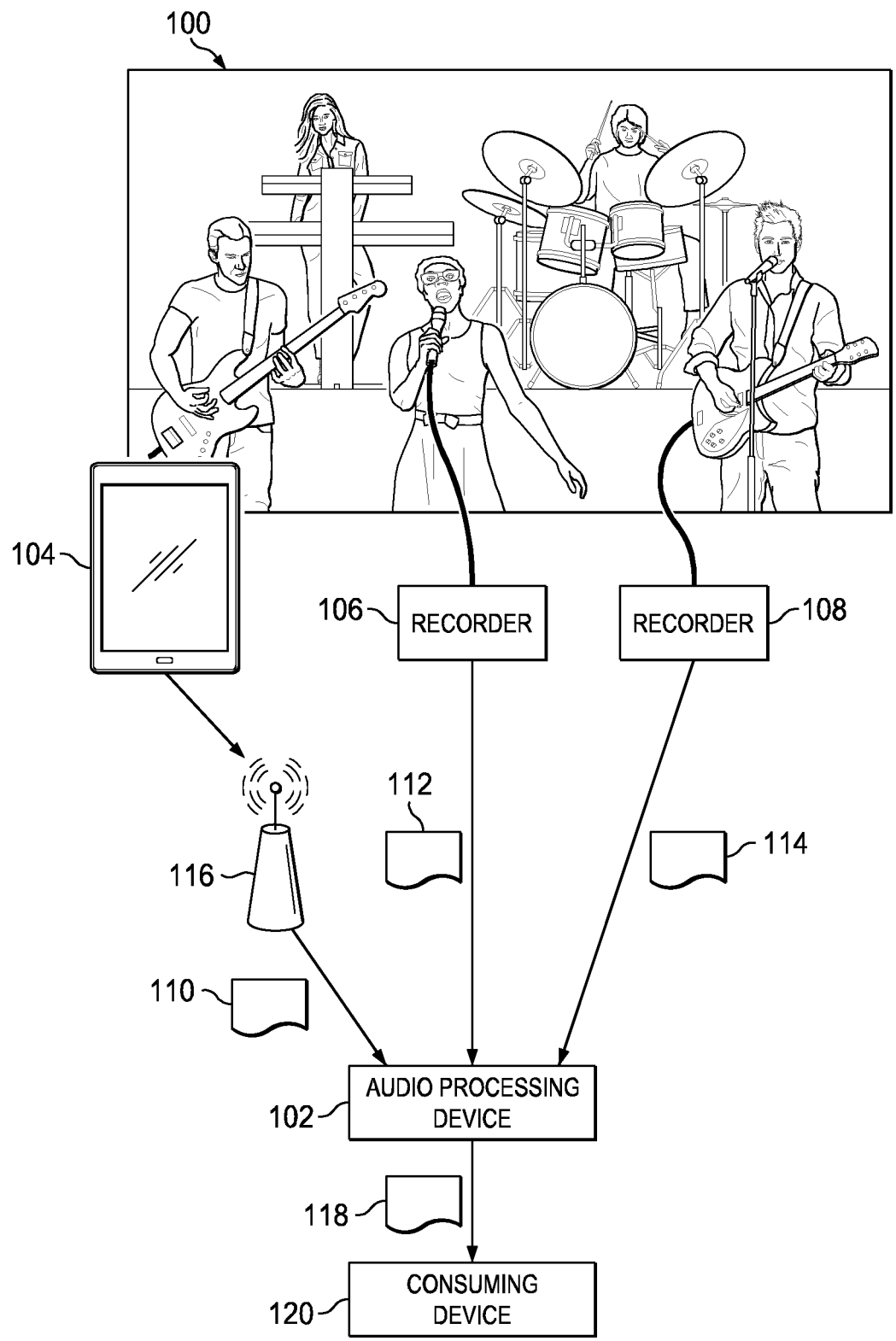
FIG. 1 is a diagram illustrating a recording session where an audio processing device synchronizes audio signals from different recording devices.

FIG. 1 is a diagram illustrating a recording session where an audio processing device synchronizes audio signals from different recording devices. An event 100 can be any event where audio content (e.g., speech, vocal music or instrumental music) is produced. In particular, the event 100 can be a live performance event, e.g., a concert, in which one or more musical instruments and/or one or more vocalists perform. One or more sound sources can be present at the event 100. Each sound source can be an instrument, a vocalist, a loudspeaker, or any item that produces sound. For convenience, sound sources including non-instrument sound sources are collectively referred to as instruments in various portions of this specification. Multiple recording devices record the event 100. An audio processing device 102 synchronizes the audio signals recorded on the devices by temporally aligning the audio signals.

In the example shown, a first device 104 records the ambience audio of the event 100. A microphone coupled to a second device 106 is a handheld by a lead vocalist. The microphone coupled to the device 106 is much closer to the lead vocalist than to other instruments. An electronic instrument is plugged into a third device 108. Due to the differences in device types, device settings and device locations, the audio signals recorded by the devices 104, 106 and 108 are dissimilar to one another.

For example, the vocalist's voice can be recorded with a close-by microphone of the device 106 and a far-away microphone of the device 104. The audio signals record by the device 104 and the device 106 can have different amounts of room reverberation. Likewise, the electronic instrument whose output is recorded by the device 108 may have only audio signals from that electronic instrument, while the others devices 104 and 106 at the event 100 may pick up audio signals from the electronic instrument acoustically together with other instruments that are also playing.

The devices 104, 106 and 108 can provide audio signals 110, 112 and 114 to the audio processing device 102. For example, the device 104 can be a smart phone configured to submit recorded audio signals 110 to the audio processing device 102 through a wireless gateway 116, e.g., a Wi-Fi™ access point. The devices 106 and 108 can have memory cards storing audio files, which can be copied to the audio processing device 102. Each of the audio signals 110, 112 and 114 includes a respective digital or analog representation of sound recorded by a respective device 104, 106 and 108.

The audio processing device 102 includes one or more computer processors to synchronize the audio signals 110, 112 and 114 such that the audio signals can be combined and mixed. Synchronizing the audio signals 110, 112 and 114 includes temporally aligning the audio signals 110, 112 and 114 by adding one or more delays to the audio signals 110, 112 and 114 such that a particular sound from a particular instrument appear at a same temporal position in the audio signals 110, 112 and 114.

In synchronizing the audio signals 110, 112 and 114, the audio processing device 102 can perform the synchronization first based on cross-correlation of waveforms and then, if possible, improve the synchronization using various techniques. For example, the audio processing device 102 can extend simple waveform-based cross-correlation via regularization or filtering. The extended waveform-based cross-correlation may result in satisfactory sound. However, for example, in cases where shape of the corresponding cross-correlation functions has wide peaks, or when neighboring peaks have similar value, the waveform-based cross-correlation, even when extended with conventional techniques, may lead to large uncertainties and lack of robustness.

The audio processing device 102 can improve the result of the simple or extended waveform-based cross-correlation using other audio features. The audio processing device 102 can perform auditory scene analysis to detect events, e.g., change of scenes, and synchronize two signals by computing event-based cross-correlation of sequence of events. The audio processing device 102 can use feature-based cross-correlation of a set of audio features, e.g., spectral centroid, zero-crossing rate, or signal energy, to compute delay between each pair of the audio signals, and then use graph theory to find the best alignment in multiple audio signals.

In particular, the audio processing device 102 aligns audio signals by computing a delay based on cross-correlations of attacks determined from envelopes of the sound signals, in addition to synchronize the audio signals according to waveform-based, event-based or feature-based cross-correlation between the audio signals. Additional details on computing the delay based on cross-correlations of attacks are discussed below in reference to FIG. 2. The audio processing device 102 can generate temporally aligned audio signals 118 from the audio signals 110, 112 and 114. Generating the temporally aligned audio signals 118 from the audio signals 110, 112 and 114 can be based on simple or extended waveform-based cross-correlations, the attack-based cross-correlations, and optionally, any or all of the event-based or feature-based cross-correlations. The aligned audio signals 118 can include delay information associated with each of the audio signals 110, 112 and 114. The aligned audio signals 118 can further include, or be associate with, quality values indicating estimated quality of the alignment. The audio processing device 102 can provide the aligned audio signals 118 to a consuming device 120. The consuming device 120 can include at least one of a non-transitory storage device, a computing device configured to perform audio editing, a mixer, a streaming server, or a playback device.

Figure 2:
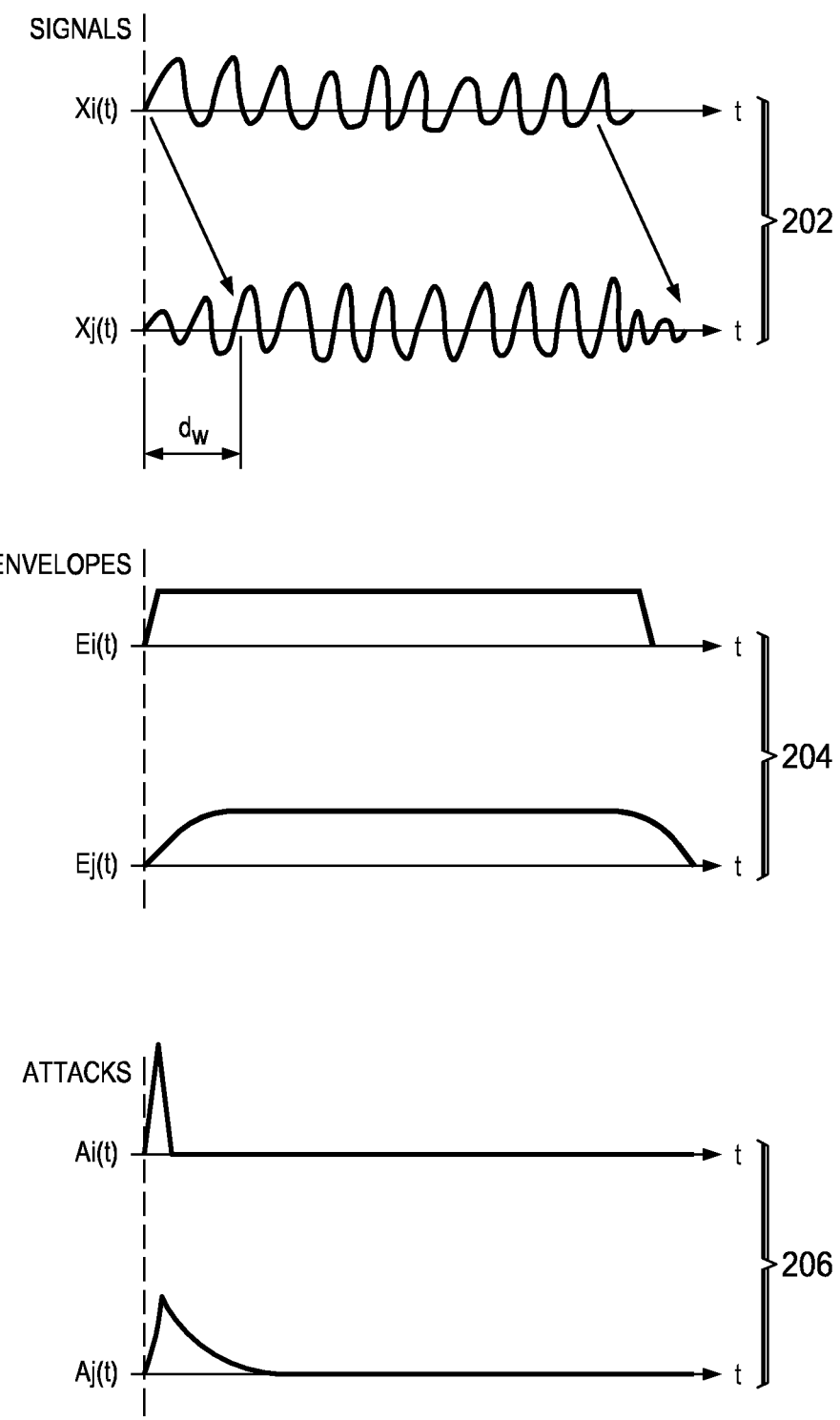
FIG. 2 is a diagram illustrating example techniques of synchronizing audio signals based on attacks.

FIG. 2 is a diagram illustrating example techniques of synchronizing audio signals based on attacks. The techniques can be implemented on an audio processing device that includes one or more processors, e.g., the audio processing device 102 of FIG. 1. For convenience, the techniques are described in terms of synchronizing two audio signals, e.g., any two of the audio signals 110, 112 and 114 of FIG. 1. The two audio signals are audio signals of a same audio event, and are designated as $x_i(t)$ and $x_j(t)$, respectively, where t is time. In synchronization, the audio processing device determines a delay to apply to one of the two audio signals to align the two audio signals temporally.

The audio processing device 102 computes a waveform-based cross-correlation between the audio signals $x_i(t)$ and $x_j(t)$ using Equation (1) below.

$$C_{i,j}(d) = \Sigma_t x_i(t) x_j(t+d), \quad (1)$$

where d is a given delay, $C_{i,j}(d)$ is waveform-based cross-correlation between the audio signals $x_i(t)$ and $x_j(t)$ for the given delay d, and d is a given delay in samples.

The audio processing device 102 can determine a particular waveform-based delay $d_w$ that aligns the audio signals $x_i(t)$ and $x_j(t)$ based on cross-correlation between waveforms of the audio signals using Equation (2) below.

$$d_w = \mathrm{argmax}(C_{i,j}(d)), \quad (2)$$

where $d_w$ is the delay that temporally aligns the audio signals according waveform-based cross-correlation between the signals, and argmax is a function that determines a domain value that maximizes the value of $C_{i,j}(d)$.

In some implementations, the audio processing device 102 can determined the waveform-based delay $d_w$ using Equation (2A) below.

$$d_w = \mathrm{argmax}(\mathrm{abs}(C_{i,j}(d))), \quad (2A)$$

where $\mathrm{abs}(C_{i,j}(d))$ is an absolute value of $C_{i,j}(d)$. In such implementations, the audio processing device 102 may optionally consider the sign of the $C_{i,j}(d)$. In response to determining that the sign is negative, the audio processing device 102 may determine that the two audio signals $x_i(t)$ and $x_j(t)$ may have inverted polarity. The audio processing device 102 can invert one of the audio signals $x_i(t)$ or $x_j(t)$ in response.

In some audio scenes, the $d_w$ derived from waveform-based cross-correlation provides a rough alignment, but may fail to give accurate results. For example, in FIG. 1, sound of a vocalist is picked-up by a close microphone associated with device 106. The sound of the electric instrument is recorded electrically by device 108. At the same time, the sound of the vocalist and the electric instrument is recorded by a distant microphone in a room, e.g., one that is on the device 104. The distant microphone will show reverberation build-up and decay, and the result of applying the cross-correlation directly may actually lead to a misalignment of the signals, as shown in item 202, where the $d_w$ misaligns the audio signals. Generally, as shown in item 202, a signal can be recorded simultaneously by two microphones, one containing reverberation build-up and decay. Even though the signals are correctly aligned, the max of the cross-correlation corresponds to a displacement of the "dry" signal $x_i(t)$ that would maximize overlap with the "wet" signal $x_j(t)$. The computation will still add $d_w$, causing the originally correctly aligned audio signals to misalign.

The audio processing device 102 can correct the misalignment and the deleterious consequences of the misalignment on perceived audio quality by using attacks in the audio signals, where amplitude of an envelope of the audio signal rises to a maximum level. The audio processing device 102 can apply information about the attacks in finding the best alignment between audio signals.

The audio processing device 102 computes envelopes $E_i(t)$ and $E_j(t)$ of the audio signals $x_i(t)$ and $x_j(t)$, respectively, as shown in item 204. Each of the envelopes $E_i(t)$ and $E_j(t)$ may include one or more attacks, decays, sustain and releases. The audio processing device 102 can compute the attacks as the positive part of the derivative of the envelopes, for example, by applying Equation (3) below to the envelopes $E_i(t)$ and $E_j(t)$.

$$A_i(t) = \partial E_i(t)/\partial t \text{ if } \partial E_i(t)/\partial t > 0; A_i(t) = 0 \text{ otherwise};$$

$$A_j(t) = \partial E_j(t)/\partial t \text{ if } \partial E_j(t)/\partial t > 0; A_j(t) = 0 \text{ otherwise}, \quad (3)$$

where $A_i(t)$ and $A_j(t)$ represent attacks of envelopes $E_i(t)$ and $E_j(t)$, respectively. Visual representations of the attacks of $A_i(t)$ and $A_j(t)$ are shown in item 206 of FIG. 2.

The audio processing device 102 can then determine an attack-based delay $d_a$ that is based on a cross-correlation between the attacks $A_i(t)$ and $A_j(t)$, rather than based on the original waveforms of the audio signals $x_i(t)$ and $x_j(t)$. The audio processing device 102 can determine the attack-based delay $d_a$ by finding the maximum cross-correlation between the attacks, for example, by using Equation (4) below.

$$d_a = \text{argmax}(\text{xcorr}(A_i(t), A_j(t))), \quad (4)$$

where xcorr is a function for determining cross-correlations, and argmax is a function for determining a domain value at which the function value is maximized. The audio processing device 102 can use the delay $d_a$ to temporarily align the audio signals $x_i(t)$ and $x_j(t)$.

Figure 3:
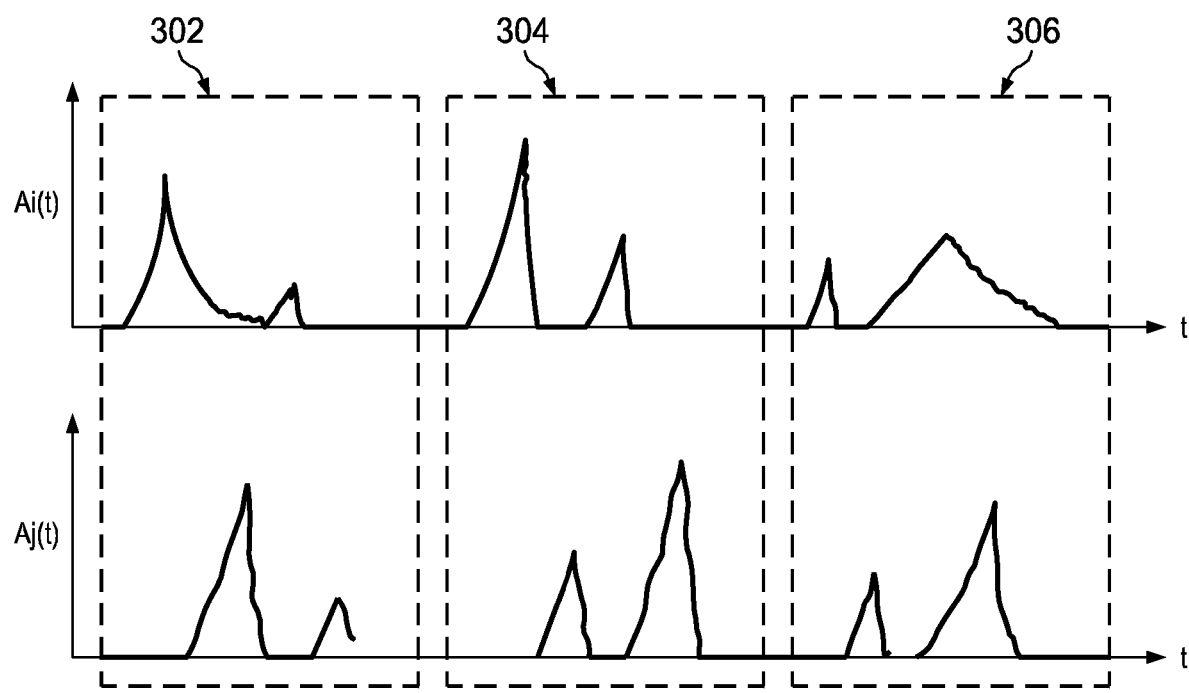
FIG. 3 is a diagram illustrating example buffering techniques in attack-based synchronization.

FIG. 3 is a diagram illustrating example buffering techniques in attack-based synchronization. To determine the attack-based delay $d_a$ for synchronizing audio signals, the audio processing device 102 (of FIG. 1) can apply the buffing techniques to avoid misalignment in long periods of recording, where the probability of aligning a section of a first audio signal with a section of a second audio signal that are temporally far apart from one another but feature-wise similar to one another cannot be ignored.

The audio processing device 102 performs pre-alignment on the audio signals $x_i(t)$ and $x_j(t)$. The pre-alignment includes synchronizing the audio signals $x_i(t)$ and $x_j(t)$ based on waveform cross-correlation. The audio processing device 102 splits the pre-aligned signals $x_i(t)$ and $x_j(t)$ into buffers of a certain length, e.g. ten seconds. Each buffer contains a section of the audio signals $x_i(t)$ and a corresponding section of the audio signal $x_j(t)$. In each buffer b, the audio processing device 102 computes a respective fine-tuned delay per buffer, referred to as buffer-level delay D(b). The audio processing device 102 can use the Equation (5) below to determine the buffer-level delays.

$$D(b) = \text{argmax}(\text{xcorr}(A_i(t|t \in b), A_j(t|t \in b))), \quad (5)$$

where D(b) is a buffer-level delay for buffer b, $A_i(t|t \in b)$ are attacks from a first audio signal $x_i(t)$, and $A_j(t|t \in b)$ are attacks from a second audio signal $x_j(t)$, as shown in FIG. 3, where attacks in buffers 302, 304 and 306 are shown.

After buffer-level delays for all buffers are computed, or for a specified amount of previous buffers are computed, the audio processing device 102 can determine an overall attack-based delay $d_a$ as the average of the buffer-level delays D(b) in X percent (e.g., 30%) of the buffers with the highest cross-correlation between attacks.

In some implementations, the audio processing device 102 chooses a most frequently appeared delay as the overall attack-based delay $d_a$. The audio processing device 102 can designate a buffer-level delay that is common to most buffers as the most frequently appeared delay. For example, the audio processing device can determine the mode of the buffer-level delay distribution. The audio processing device 102 constructs a histogram of the buffer-level delay values, where the histogram bin-width corresponds to a maximum acceptable misalignment, for example, X milliseconds (ms). The audio processing device 102 then identifies a most-popular bin, which is a bin where most buffer-level delay values fall. The audio processing device 102 computes the attack-based delay $d_a$ as the average of the buffer-delays in such most-populated bin.

For the buffer with the best value of cross-correlation between attacks, the audio processing device 102 can compute a quality value Q that represents a quality of the attack-based cross-correlation as a ratio between the largest peak of the cross-correlation and the second-largest peak of the cross-correlation. The audio processing device 102 can determine whether to apply the attack-based delay $d_a$ to synchronize the audio signals $x_i(t)$ and $x_j(t)$ based on two conditions on the quality value Q.

First, the audio processing device 102 can determine to apply the delay $d_a$ to synchronize the audio signals $x_i(t)$ and $x_j(t)$ in response to determining that the quality value Q satisfies a pre-specified threshold. This condition can ensure that the cross-correlation between attacks are reliable for synchronizing the audio signals.

Second, the audio processing device 102 can determine to apply the delay $d_a$ to synchronize the audio signals $x_i(t)$ and $x_j(t)$ in response to determining that applying the delay $d_a$ is not going to worsen the correlation of the audio signals as achieved by $d_w$ beyond a tolerable amount. To determine whether this condition is met, the audio processing device 102 determines a maximum value $C_{max}$ of the cross-correlation between audio signals in the buffer with the highest cross-correlation and its two immediate neighboring buffers, e.g., one before and one after. The audio processing device 102 determines an initial maximum value $C_{init}$ of the waveform-based cross-correlation computed across the whole audio signals. The audio processing device 102 can then determine to apply the delay $d_a$ to synchronize the audio signals $x_i(t)$ and $x_j(t)$ in response to determining that the value $C_{max}$ is greater than a pre-specified fraction of the value $C_{init}$.

In response to determining that at least one of the two conditions specified above is not satisfied, the audio processing device 102 synchronizes the audio signals $x_i(t)$ and $x_j(t)$ using the waveform-based delay $d_w$ as derived using Equation (2) above. In response to determining that both conditions are satisfied, the audio processing device 102 synchronizes the audio signals $x_i(t)$ and $x_j(t)$ using the attack-based delay $d_a$. The audio processing device 102 can store the quality value of the cross-correlation between audio signals corresponding to the chosen delay value as an indicator of the confidence of the synchronization.

The above-described operations are applicable to the whole duration of the audio signals, and are suitable for offline processing. In various implementations, the audio processing device 102 can perform the operations adaptively in a real time environment. For example, the audio processing device 102 can perform the described computations on only the past samples up to a current time. The audio processing device 102 can perform the computations on all past samples or samples of a specified history range, e.g., last X seconds.

The audio processing device 102 can synchronize audio signals from multiple devices. In the example shown, the audio processing device 102 can synchronize the audio signals from the devices 104, 106 and 108 of FIG. 1. In some implementations, a particular device, e.g., the device 102, can capture information from all sound sources. The audio processing device can synchronize all other devices to that device. In some implementations, the audio processing device can synchronize two audio signals at a time, and seek out the best pair.

The audio processing device 102 can determine a respective attack-based delay $d_a(i,j)$ for each pair of audio signals $x_i(t)$, $x_j(t)$. In some implementations, the audio processing device 102 can synchronize each audio signal to a designated reference signal. The audio processing device 102 can designate one of the audio signals in the set, e.g., an audio signal from a particular microphone that picked up all the sources at the audio event, as the reference signal. The audio processing device 102 can designate a combination of some audio signals in the set, e.g., a down-mixed mono signal that includes a sum of two signals from a stereo microphone at the event.

In some implementations, the audio processing device 102 can synchronize the audio signals in pairs recursively in order of confidence. The audio processing device 102 can add the audio signals to a list. The audio processing device 102 determines a respective quality value $Q(i,j)$ for each pair of audio signals $x_i(t)$, $x_j(t)$ in the list. The audio processing device 102 determines the highest quality value from the quality values. The audio processing device 102 synchronizes the pair of audio signals corresponding to the highest quality value. The audio processing device 102 removes at least one of the audio signals $x_i(t)$, $x_j(t)$, now synchronized, from the list. The audio processing device 102 synchronizes another pair of audio signals with the next highest quality value. The audio processing device 102 continues until all audio signals in the list are synchronized.

Figure 4:
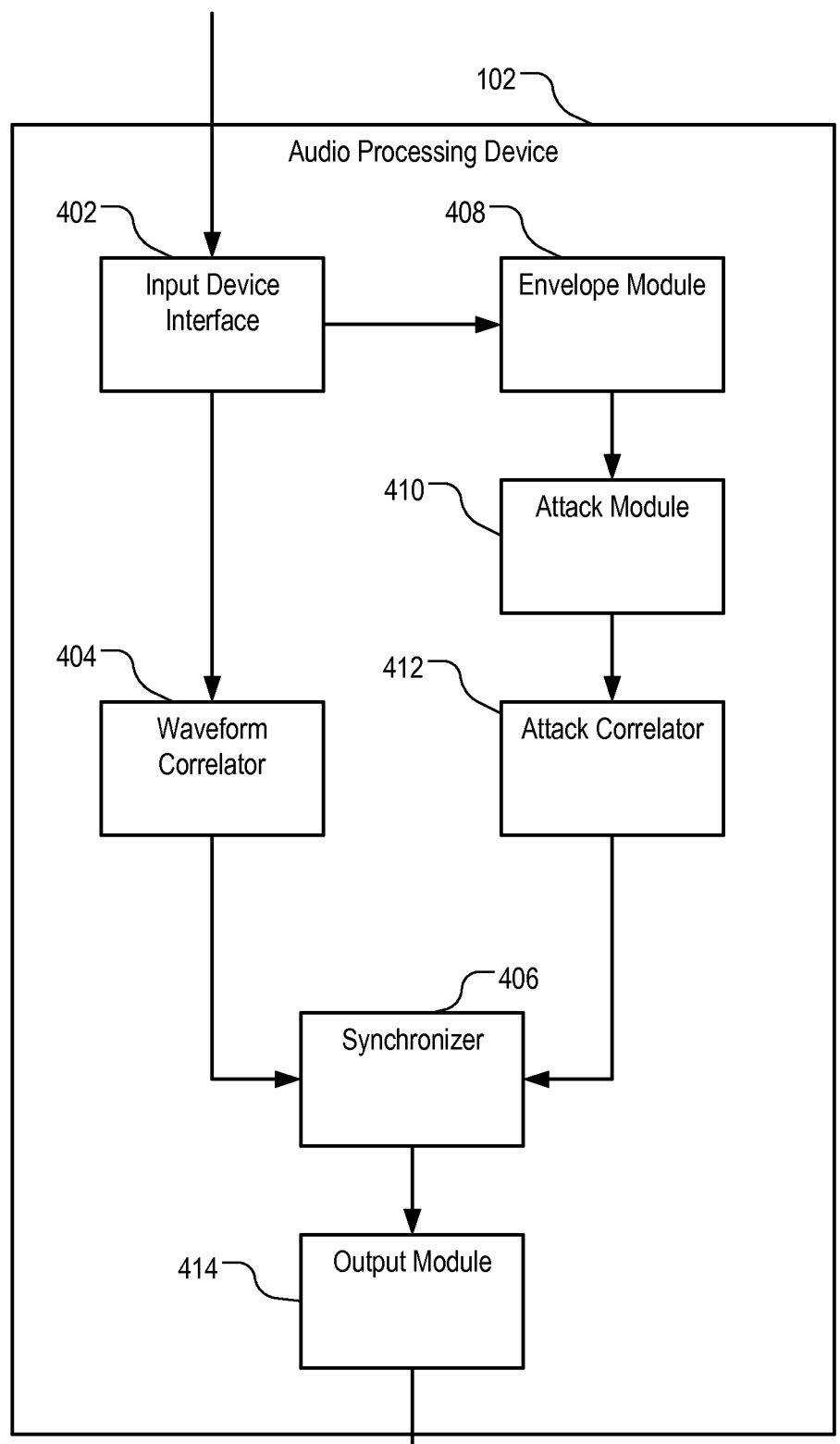
FIG. 4 is a block diagram illustrating components of an example audio processing device configured to perform attack-based synchronization.

FIG. 4 is a block diagram illustrating components of an example audio processing device 102 configured to perform attack-based synchronization. Each component of the audio processing device 102 includes hardware and software or hardware and firmware components.

The audio processing device 102 includes an input device interface 402. The input device interface 402 is a component of the audio processing device 102 configured to receive audio signals from multiple devices, e.g., audio files from smartphones or digital voice recorders. The input device interface 402 can include one or more non-transitory storage devices for storing the audio signals.

The input device interface 402 can provide the audio signals to a waveform correlator 404. The waveform correlator 404 is a component of the audio processing device 102 configured to determine a waveform-based delay, e.g., the delay $d_w$ of Equation (2), from the audio signals. The waveform correlator 404 can provide the waveform-based delay to a synchronizer 406.

The input device interface 402 provides the audio signals to an envelope module 408. The envelope module 408 is a component of the audio processing device 102 configured to determine a respective envelope for each audio signal. Each envelope can include a smooth curve outlining the maximum value of a respective oscillating audio signal. The envelope module 408 provides the envelopes to an attack module 410.

The attack module 410 is a component of the audio processing device 102 configured to calculate derivatives of the envelopes and determine respective attacks of each envelope. The attack module 410 provide representations of the attacks to an attack correlator 412.

The attack correlator 412 is a component of the audio processing device 102 configured to determine an attack-based delay, e.g., the delay $d_a$ as described above, from the envelopes. The attack correlator 412 can provide the attack-based delay to the synchronizer 406.

The synchronizer 406 is a component of the audio processing device 102 configured to determine a quality value for using data provided from the waveform correlator 404 and the attack correlator 412. The synchronizer 406 can apply the waveform-based delay to synchronize the audio signals and then to adjust the synchronization using the attack-based delay. The synchronizer 406 can synchronize the audio signals, and provide the synchronized audio signals to an output module 414.

The output module 414 is a component of the audio processing device 102 configured to provide the synchronized audio signals, including, for example, calculated delay values, to a consuming device for storage, streaming, or playback. The output module 414 can provide various data related to the synchronization, e.g., quality values, attack waveforms, for presentation on a display device, e.g., on an editing or mixing console.

Example Process

Figure 5:
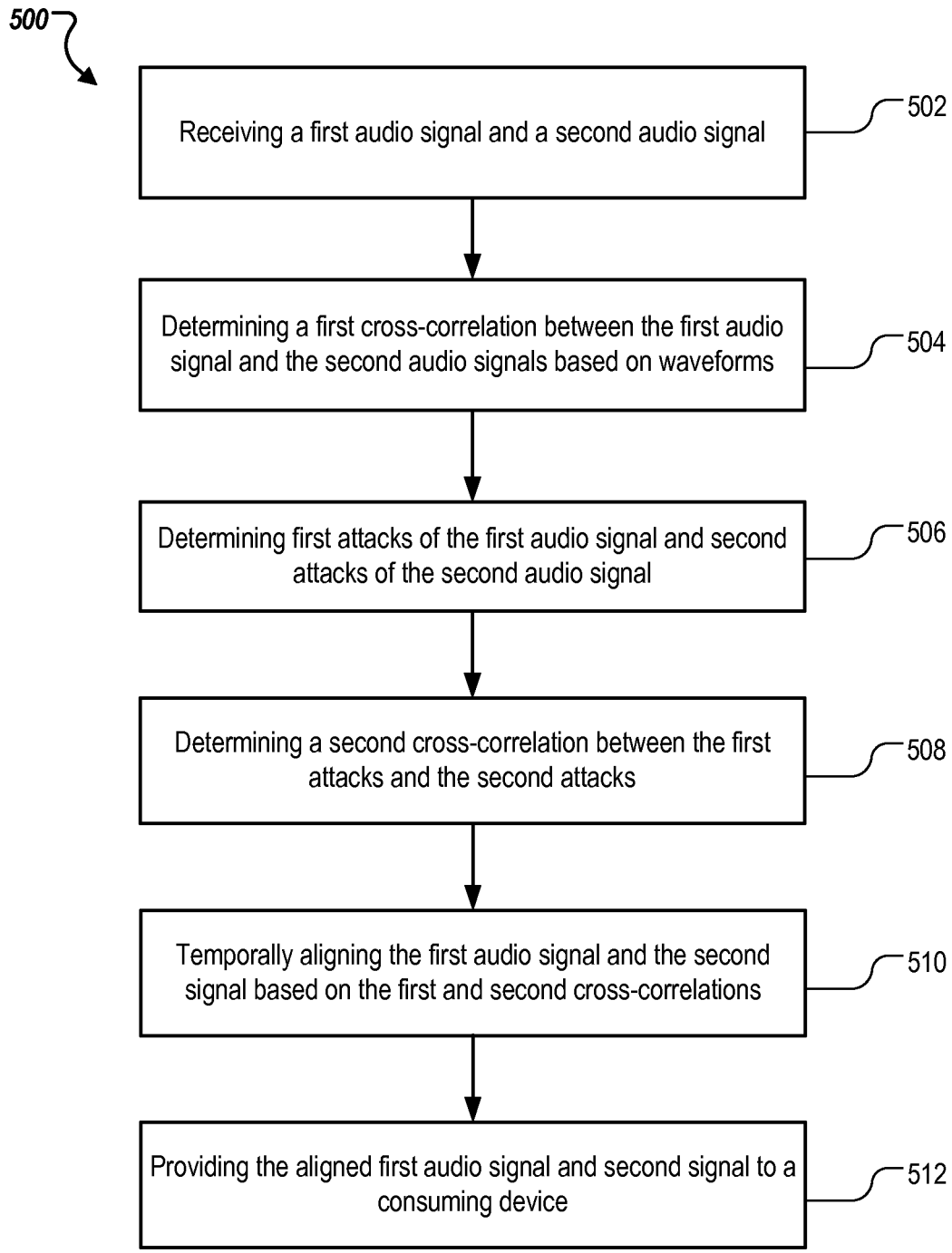
FIG. 5 is a flowchart of an example process of synchronizing audio signals based on attacks.

FIG. 5 is a flowchart of an example process 500 of synchronizing audio signals based on attacks. The process 500 can be performed by an audio processing device, e.g., the audio processing device 102 of FIG. 1.

The audio processing device receives (502) a first audio signal and a second audio signal. The first audio signal and second audio signal may be recorded by separate and independent devices. The audio signals may not be temporally aligned.

The audio processing device determines (504) a first cross-correlation between the first audio signal and the second audio signal based on waveforms of the first audio signal and the second audio signal.

The audio processing process determines (506) first attacks of the first audio signal and second attacks of the second audio signal. Determining the first attacks and the second attacks can include determining a first envelope of the first audio signal and a second envelope of the second audio signals. The audio processing can determine the first attacks as positive derivatives of the first envelope. The audio processing can determine the second attacks as positive derivatives of the second envelope. Determining the first attacks and the second attacks can include performing operations that apply the Equation (3) to the envelopes.

The audio processing device determines (508) a second cross-correlation between the first attacks and the second attacks. The audio processing process synchronizes (510) the first audio signal and the second audio signal based on the first and second cross-correlations. Synchronizing the first audio signal and the second audio signal includes temporally aligning the first audio signal and the second audio signal based on the first and second cross-correlations in such a way that, when the synchronized audio signals are played, the audio signals accurately represent timing of the sounds at an audio event.

Temporally aligning the first audio signal and the second audio signal can include the following operations. The audio processing device can determine the first cross-correlation of the first audio signal and the second audio signal, for example, as the waveform-based cross-correlation $C_{i,j}(d)$ as described above. The audio processing device then pre-aligns the first audio signal and the second audio signal according to a first delay that corresponds to the maximum value, or maximum absolute value, of the first cross-correlation between the first audio signal and the second audio signal. The audio processing device then adjusts an alignment of the pre-aligned first audio signal and the second audio signal according to a second delay that corresponds to a maximum value of the second cross-correlation between the first attacks and the second attacks.

When pre-aligning the first audio signal and the second audio signal is performed according to the first delay that corresponds to the maximum absolute value of the first cross-correlation, the audio processing device can perform the following operations. The audio processing device can determine that a sign of the first cross-correlation at the maximum absolute value is negative. In response, the audio processing device can invert one of the first audio signal or the second audio signal to correct polarity of the signals.

Adjusting the alignment of the pre-aligned first audio signal and the second audio signal according to the second delay can include the following operations. The audio processing device splits the pre-aligned first audio signal and the second audio signal into multiple corresponding buffers. Each buffer can have a given length, e.g., ten seconds. For each of the buffers, the audio processing device computes a respective cross-correlations between a portion of the first attacks that is within the buffer and a portion of the second attacks that is within the buffer. The audio processing device determines, for each buffer, a respective buffer-level delay D(b) according to a maximum value of the respective cross-correlations, e.g., by applying Equation (5). The audio processing device determines the second delay, e.g., the overall attack-based delay $d_a$, from the buffer-level delays. The audio processing device then adjusts the pre-aligned first audio signal and the second audio signal according to the second delay.

In some implementations, determining the second delay from the buffer-level delays can include the following operations. The audio processing device selects, from the buffer-level delays, one or more buffer-level delays that correspond to one or more highest cross-correlations between the first attacks and the second attacks among the buffers. The audio processing device then designates an average of the selected one or more buffer-level delays as the second delay, e.g., the attack-based delay $d_a$.

In some implementations, determining the second delay from the buffer-level delays can include the following operations. The audio processing device determines a histogram of buffer-level delays. The histogram includes multiple bins for buffers. Each bin having a bin width measured in time. The bin width for the bins can correspond to a pre-specified maximum acceptable misalignment value, e.g., 15 ms. Each bin contains one or more buffer-level delays having values within the bin width, e.g., between 1000 ms and 1015 ms. The audio processing device can select, from the bins, one or more most popular bins. A most popular bin is a bin in the histogram having a maximum number of buffer-level delays among the bins. The audio processing device can designate an average of the buffer-level delays in the most popular bin, e.g., 1008 ms, as the second delay.

Adjusting the alignment of the pre-aligned first audio signal and the second audio signal according to the second delay can include the following operations. The audio processing device determines a quality value that indicates estimated quality of the cross-correlations between the first attacks and the second attacks. The audio processing determines whether a first condition for adjusting the alignment is satisfied. The first condition specifies that the quality value shall be greater than a threshold. The audio processing determines whether a second condition for adjusting the alignment is satisfied. The second condition specifying that applying the second delay shall not worsen already achieved cross-correlations of the pre-aligned first audio signal and second audio signal beyond a specified amount. The second condition can ensure that applying the second delay shall not lead to a cross-correlation value below an original cross-correlation value by more than a specified threshold. The already achieved cross-correlation can include waveform-based cross-correlations or absolute values of waveform-based cross-correlations. The audio processing device adjusts the alignment in response to determining that both the first condition and the second condition are satisfied.

Determining the quality value can include the following operations. The audio processing device can split the pre-aligned first audio signal and the second audio signal into multiple buffers. For each of the buffers, the audio processing device computes respective cross-correlations between a portion of the first attacks within the buffer and a portion of the second attacks within the buffer. The audio processing device determines, for each buffer, a respective buffer-level delay according to a maximum value of the respective cross-correlations. The audio processing device selects a buffer having a highest corresponding cross-correlation between attacks. The audio processing device determines the quality value as ratio between a highest peak of cross-correlation between attacks in the selected buffer and a second highest peak of cross-correlation between attacks in the selected buffer.

After the quality value is determined, the audio processing device can determine whether the second condition is satisfied by determining whether a maximum value of cross-correlation between audio signals in a set of buffers including the selected buffer and two neighboring buffers is greater than a specified fraction of a maximum value of the waveform-based cross-correlation, rather than the attack-based cross-correlation, computed across the first and second audio signals $x_i(t)$ and $x_j(t)$ in the entirety.

In some implementations, the audio processing device determines whether the second condition is satisfied by performing the following operations. The audio processing device selects, from the buffers, a buffer having a highest corresponding cross-correlation between attacks and, optionally, one or more of its neighboring buffers. The audio processing device applies the second delay, e.g., the attack-based delay $d_a$, to adjust alignment of the audio signals in the selected buffer or buffers. After applying the second delay, the audio processing device re-computes a waveform-based cross-correlation between the first and second audio signals. The audio processing device then removes local oscillations of the waveform-based cross-correlation. Removing the local oscillations can include computing an envelope of the waveform-based cross-correlation. The audio processing device can determine that the second condition is satisfied in response to determining that the value of the envelope of the waveform-based cross-correlation at the applied delay is greater than a specified fraction of a maximum value of the waveform-based cross-correlation computed across the first and second audio signals in the entirety.

The audio processing device provides (512) the aligned first audio signal and second audio signal to a consuming device. The consuming device can include one or more of a storage device (e.g., a disk or memory card), a streaming device (e.g., a streaming server), an editing device (e.g., a mixing console), or a presentation device (e.g., an amplifier and one or more speakers).

The audio processing device can synchronize more than two audio signals. The audio processing device can synchronize a third audio signal with the first audio signal and the second audio signal. In some implementations, synchronizing the third audio signal with the first audio signal and the second audio signal can include the following operations. The audio processing device designates the first audio signal, the second audio signal, or a combination, e.g., a downmix, of the first audio signal and the second audio signal as a reference signal. The audio processing device then synchronizes the third audio signal with the reference signal. The audio processing device can synchronize additional audio signals in a similar manner.

In some implementations, synchronizing the third audio signal with the first audio signal and the second audio signal can include the following operations. The audio processing device adds the first audio signal, second audio signal, third audio signal and any other audio signals to be synchronized to a list. The audio processing device then recursively performs list reduction actions until all audio signals in the list are synchronized. The list reduction actions include the following operations. The audio processing device selects two audio signals from the list based on cross-correlation quality, e.g., by selecting two audio signals that have the highest cross-correlation. The audio processing device synchronizes the selected audio signals. The audio processing device removes at least one of the synchronized audio signals from the list. The audio processing device repeats these operations.

Exemplary Device Architecture

Figure 6:
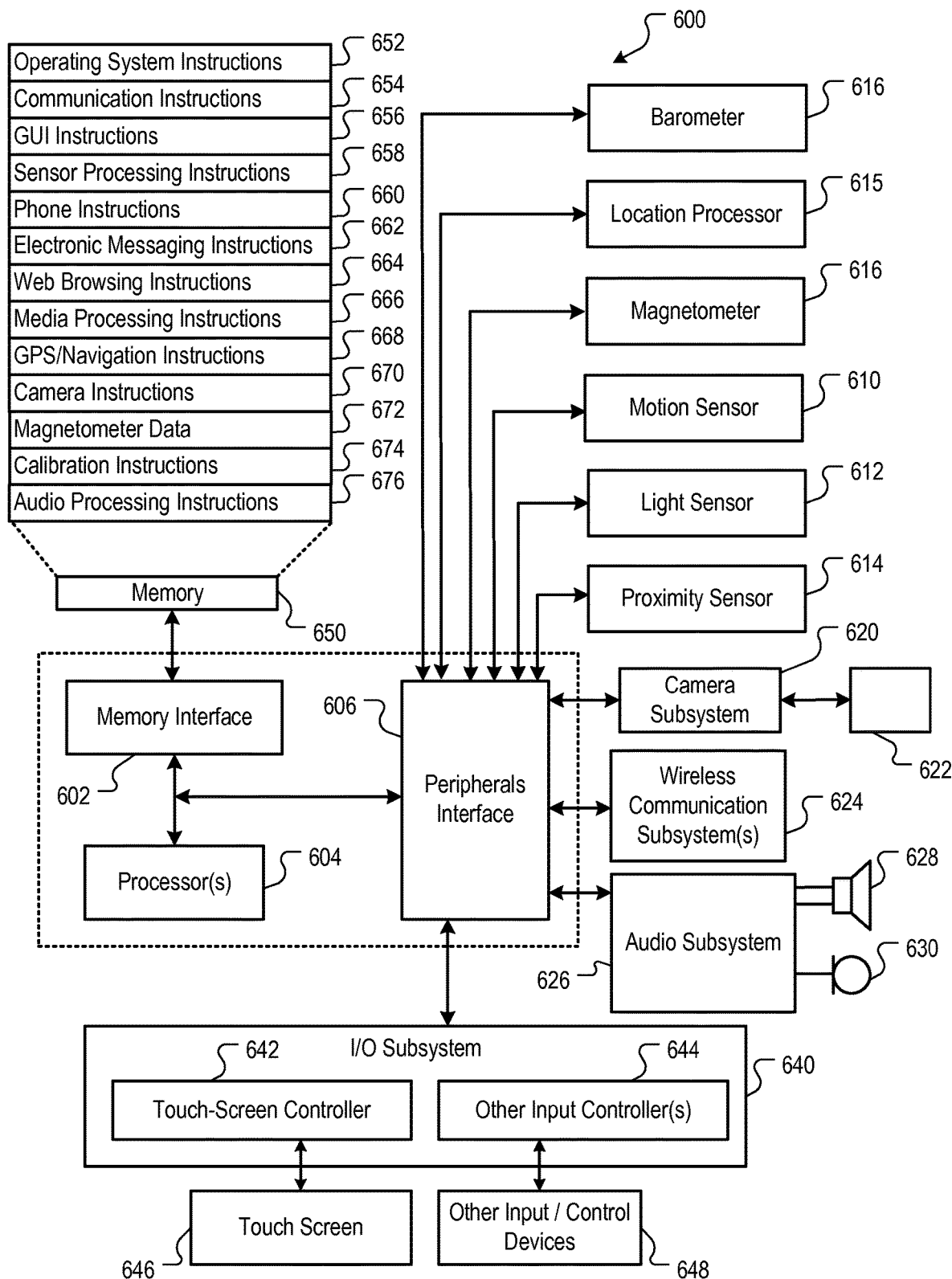
FIG. 6 is a block diagram illustrating an example device architecture of a mobile device implementing the features and operations described in reference to FIGS. 1-5.

FIG. 6 is a block diagram illustrating an exemplary device architecture 600 of a device implementing the features and operations described in reference to FIGS. 1-5. The device can be, for example, audio processing device 102 of FIGS. 1-5. A device can include memory interface 602, one or more data processors, image processors and/or processors 604 and peripherals interface 606. Memory interface 602, one or more processors 604 and/or peripherals interface 606 can be separate components or can be integrated in one or more integrated circuits. Processors 604 can include application processors, baseband processors and wireless processors. The various components in the mobile device, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 can be connected to peripherals interface 606 to provide geopositioning. In some implementations, location processor 615 can be programmed to perform the operations of a GNSS receiver. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Location instructions 668 to facilitate generic GNSS and location-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store audio processing instructions 676 that, when executed by processor 604, can cause processor 604 to perform various operations including, for example, the operations of the audio processing device 102 of FIGS. 1-5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
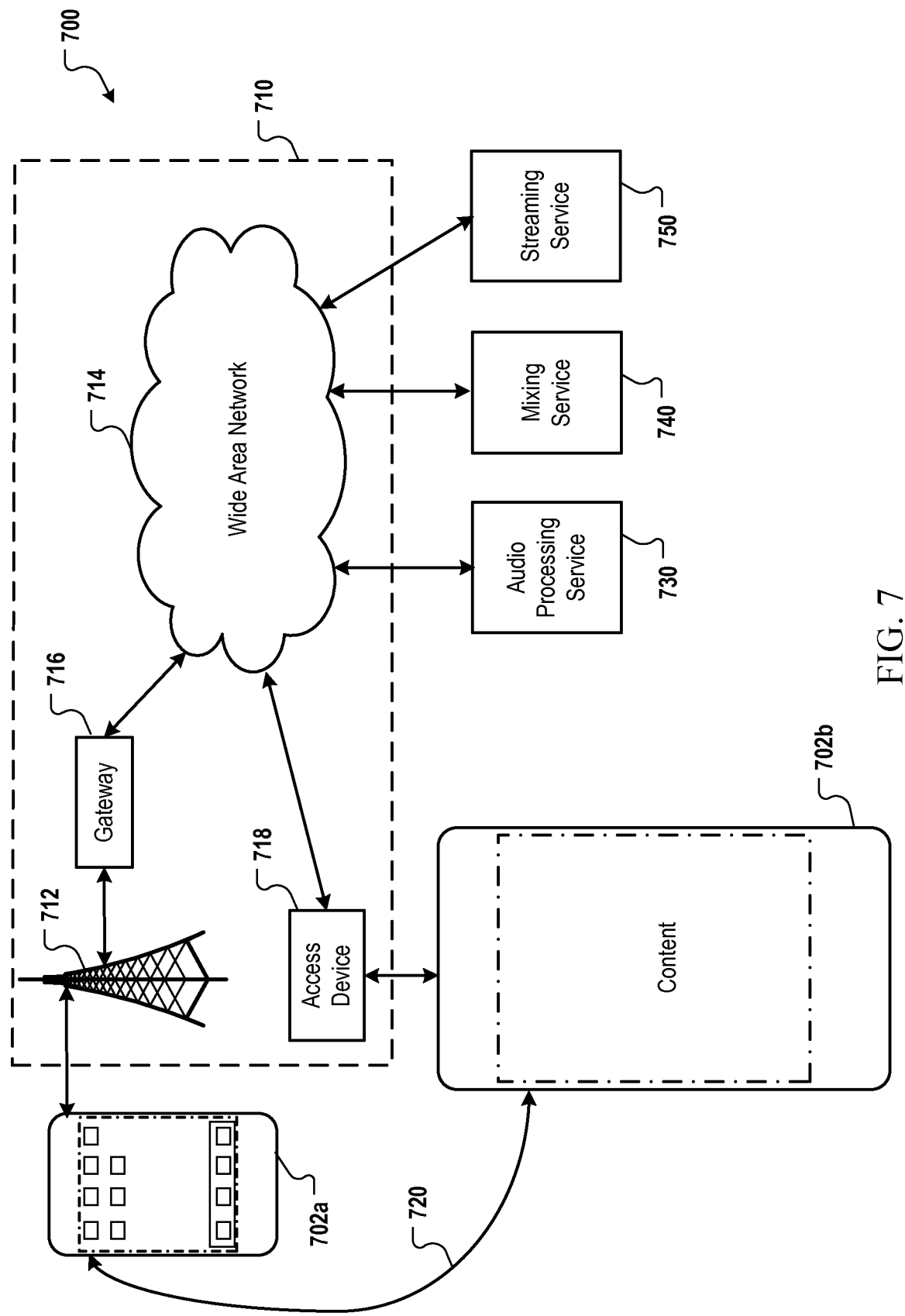
FIG. 7 is a block diagram of an example network operating environment for the devices in FIGS. 1-5.

FIG. 7 is a block diagram of an example network operating environment 700 for the devices of FIGS. 1-5. Devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of the devices 702a and 702b can be one of the devices 102, 104, 106 or 108 of FIG. 1.

In some implementations, both voice and data communications can be established over wireless network 712 and the access device 718. For example, device 702a can place and receive phone calls (e.g., using voice over Internet Protocol (VoIP) protocols), send and receive e-mail messages (e.g., using Post Office Protocol 3(POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the device 702b can place and receive phone calls, send and receive e-mail messages, and retrieve electronic documents over the access device 718 and the wide area network 714. In some implementations, device 702a or 702b can be physically connected to the access device 718 using one or more cables and the access device 718 can be a personal computer. In this configuration, device 702a or 702b can be referred to as a "tethered" device.

Devices 702a and 702b can also establish communications by other means. For example, wireless device 702a can communicate with other wireless devices, e.g., other mobile devices, cell phones, etc., over the wireless network 712. Likewise, devices 702a and 702b can establish peer-to-peer communications 720, e.g., a personal area network, by use of one or more communication subsystems, such as the Bluetooth™ communication devices. Other communication protocols and topologies can also be implemented.

The device 702a or 702b can, for example, communicate with one or more services 730, 740 and 750 over the one or more wired and/or wireless networks. For example, one or more audio services 730 can provide services of audio processing including synchronizing audio signals as described above in reference to FIG. 1-5. For example, an audio service 730 can include cloud-based operations of process 500 as described in reference to FIG. 5. Mixing service 740 can provide user interfaces that allow a mixing professional to log in through a remote console to perform post-synchronization mixing operations on audio signals. Streaming service 750 can provide user interfaces that allow a user device to download or stream synchronized and mixed audio signals.

Device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by device 702a or 702b. Such access can be provided by invocation of a web browsing function or application (e.g., a browser) in response to a user touching, for example, a Web object.

Example System Architecture

Figure 8:
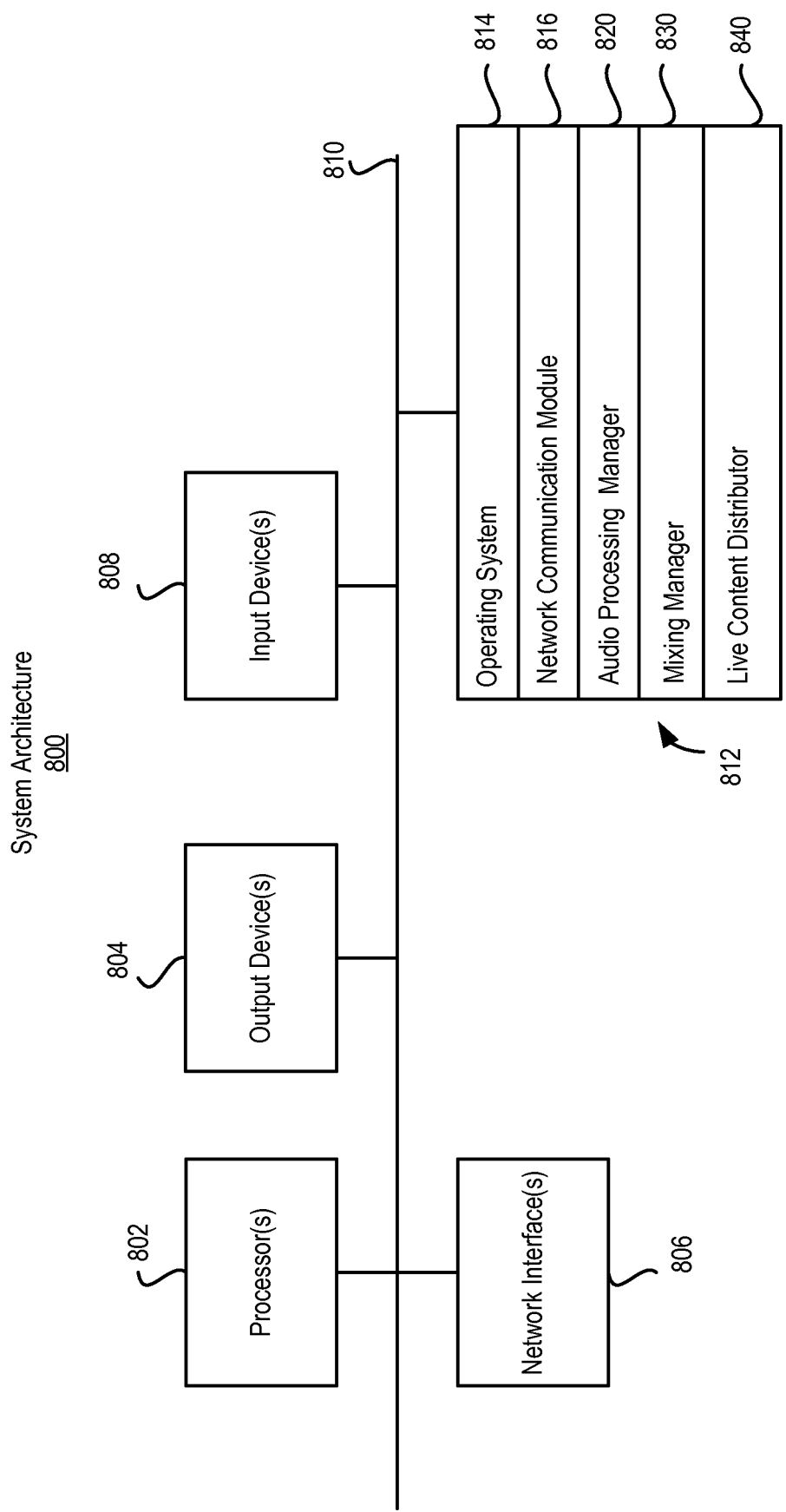
FIG. 8 is a block diagram of an example system architecture for an example computing device implementing the features and operations described in reference to FIGS. 1-5.

FIG. 8 is a block diagram of a system architecture for an example computing device implementing the features and operations described in reference to FIGS. 1-5. The computing device can be the audio processing device 102 of FIG. 1-5. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to a medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., a Linux® operating system), network communication module 816, audio processing manager 820, video processing manager 830 and live content distributor 840. Operating system 814 can be multi-user, multiprocessing, multitasking, multithreading, real time, etc. Operating system 814 performs basic tasks, including but not limited to: recognizing input from and providing output to network interfaces 806 and/or devices 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.).

Audio processing manager 820 can include computer instructions that, when executed, cause processor 802 to perform various audio processing operations as described above, e.g., in reference to the audio processing device 102. Mixing manager 830 can include computer instructions that, when executed, cause processor 802 to perform audio editing and manipulation operations, including mixing synchronized audio signals. Live content distributor 840 can include computer instructions that, when executed, cause processor 802 to perform operations of streaming synchronized audio signals to one or more user devices.

Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

Various aspects of the present invention may be appreciated from the following enumerated example embodiments (EEEs):

1. A method comprising:
    receiving a first audio signal and a second audio signal;
    determining a first cross-correlation between the first audio signal and the second audio signal based on waveforms of the first audio signal and the second audio signal;
    determining first attacks of the first audio signal and second attacks of the second audio signal;
    determining a second cross-correlation between the first attacks and the second attacks;
    temporally aligning the first audio signal and the second audio signal based on the first and second cross-correlations; and
    providing the aligned first audio signal and second audio signal to a consuming device, where the method is performed by one or more computer processors.

2. The method of EEE 1, wherein determining the first attacks and the second attacks comprises:
    determining a first envelope of the first audio signal and a second envelope of the second audio signals;
    determining the first attacks as positive parts of the derivative of the first envelope; and
    determining the second attacks as positive parts of the derivative of the second envelope.

3. The method of EEE 1 or 2, wherein temporally aligning the first audio signal and the second audio signal comprises:
    pre-aligning the first audio signal and the second audio signal according to a first delay that corresponds to a maximum value or a maximum absolute value of the first cross-correlation between the first audio signal and the second audio signal; and
    adjusting an alignment of the pre-aligned first audio signal and the second audio signal according to a second delay that corresponds to a maximum value of the second cross-correlation between the first attacks and the second attacks.

4. The method of EEE 3, wherein
    pre-aligning the first audio signal and the second audio signal is performed according to the first delay that corresponds to the maximum absolute value of the first cross-correlation, and
    the method includes:
        determining that a sign of the first cross-correlation at the maximum absolute value is negative; and
        inverting one of the first audio signal or the second audio signal.

5. The method of EEE 3, wherein adjusting the alignment of the pre-aligned first audio signal and the second audio signal according to the second delay comprises:
    splitting the pre-aligned first audio signal and the second audio signal into a plurality of buffers;
    for each of the buffers:
        computing respective cross-correlations between a portion of the first attacks within the buffer and a portion of the second attacks within the buffer; and
        determining a respective buffer-level delay according to a maximum value of the respective cross-correlations; and
    determining the second delay from the buffer-level delays; and
    adjusting the pre-aligned first audio signal and the second audio signal according to the second delay.

6. The method of EEE 5, wherein determining the second delay from the buffer-level delays comprises:
    selecting, from the buffer-level delays, one or more buffer-level delays that correspond to one or more highest cross-correlations between the first attacks and the second attacks among the buffers; and
    designating an average of the selected one or more buffer-level delays as the second delay.

7. The method of EEE 5, wherein determining the second delay from the buffer-level delays comprises:
    determining a histogram of the buffer-level delays, the histogram including a plurality of bins, each bin having a bin width corresponding to a pre-specified maximum acceptable misalignment value, each bin containing one or more buffer-level delays having values within the bin width;
    selecting, from the bins, a most popular bin, the most popular bin being a bin in the histogram having a maximum number of buffer-level delays among the bins; and
    designating an average of the buffer-level delays in the most popular bin as the second delay.

8. The method of EEE 3, wherein adjusting the alignment of the pre-aligned first audio signal and the second audio signal comprises:
    determining a quality value that indicates estimated quality of the cross-correlations between the first attacks and the second attacks;

determining whether a first condition for adjusting the alignment is satisfied, the first condition specifying that the quality value shall be greater than a threshold;

determining whether a second condition for adjusting the alignment is satisfied, the second condition specifying that applying the second delay shall not lead to a cross-correlation value below an original cross-correlation value by more than a specified threshold; and adjusting the alignment in response to determining that both the first condition and the second condition are satisfied.

9. The method of EEE 8, wherein determining the quality value comprises:

splitting the pre-aligned first audio signal and the second audio signal into a plurality of buffers;

for each of the buffers:
computing respective cross-correlations between a portion of the first attacks within the buffer and a portion of the second attacks within the buffer; and
determining a respective buffer-level delay according to a maximum value of the respective cross-correlations;

selecting one or more buffers from the plurality of buffers based on corresponding cross-correlation between attacks; and determining the quality value as a ratio between a highest peak of cross-correlation between attacks in the selected buffer and a second highest peak of cross-correlation between attacks in the selected buffer.

10. The method of EEE 9, wherein determining whether the second condition is satisfied comprises:

selecting, from the buffers, a buffer having a highest corresponding cross-correlation between attacks;

applying the second delay to adjust alignment of the first and second audio signals in the selected buffer;

computing a waveform-based cross-correlation between the first and second audio signals after applying the second delay;

computing an envelope of the waveform-based cross-correlation; and determining that the second condition is satisfied in response to determining that a value of the envelope is greater than a specified fraction of a maximum value of a cross-correlation computed across the first and second audio signals in the entirety.

11. The method of EEE 9, wherein selecting the one or more buffers from the plurality of buffers comprises selecting a particular buffer having a highest corresponding cross-correlation between attacks.

12. The method of EEE 11, wherein selecting the one or more buffers from the plurality of buffers further comprises selecting one or more neighboring buffers of the particular buffer.

13. The method of any preceding EEE, comprising synchronizing a third audio signal with the first audio signal and the second audio signal.

14. The method of EEE 13, wherein synchronizing the third audio signal with the first audio signal and the second audio signal comprises:

designating the first audio signal, the second audio signal, or a combination of the first audio signal and the second audio signal as a reference signal; and synchronizing the third audio signal with the reference signal.

15. The method of EEE 13, wherein synchronizing the third audio signal with the first audio signal and the second audio signal comprises:

adding the first audio signal, second audio signal and third audio signal to a list;

recursively performing list reduction actions until all audio signals in the list are synchronized, the list reduction actions comprising:
selecting two audio signals from the list based on cross-correlation quality;
synchronizing the selected audio signals; and
removing at least one of the synchronized audio signals from the list.

16. A system comprising:
one or more processors; and
a non-transitory computer-readable medium storing instructions that, when executed by the one or more processors, cause the one or more processors to perform the method of any one of EEEs 1 to 15.

17. A non-transitory computer-readable medium storing instructions that, when executed by one or more processors, cause the one or more processors to perform the method of any one of EEEs 1 to 15.

The invention claimed is:

1. A method comprising:
receiving a first audio signal and a second audio signal;
determining a first cross-correlation between the first audio signal and the second audio signal based on waveforms of the first audio signal and the second audio signal;
determining first attacks of the first audio signal and second attacks of the second audio signal, wherein determining the first attacks and the second attacks comprises determining a first envelope of the first audio signal and a second envelope of the second audio signal, determining the first attacks as positive parts of a mathematical derivative of the first envelope, and determining the second attacks as positive parts of a mathematical derivative of the second envelope;
determining a second cross-correlation between the first attacks and the second attacks;
synchronizing the first audio signal and the second audio signal by temporally aligning the first audio signal and the second audio signal based on the first and second cross-correlations; and
providing the aligned first audio signal and second audio signal to a consuming device for storage, streaming or playback.

2. The method of claim 1, wherein temporally aligning the first audio signal and the second audio signal comprises:
pre-aligning the first audio signal and the second audio signal according to a first delay that corresponds to a maximum value or a maximum absolute value of the first cross-correlation between the first audio signal and the second audio signal; and
adjusting an alignment of the pre-aligned first audio signal and the second audio signal according to a second delay that corresponds to a maximum value of the second cross-correlation between the first attacks and the second attacks.

3. The method of claim 2, wherein
pre-aligning the first audio signal and the second audio signal is performed according to the first delay that corresponds to the maximum absolute value of the first cross-correlation, and
the method includes:
determining that a sign of the first cross-correlation at the maximum absolute value is negative; and
inverting one of the first audio signal or the second audio signal.

4. The method of claim 2, wherein adjusting the alignment of the pre-aligned first audio signal and the second audio signal according to the second delay comprises:
  splitting the pre-aligned first audio signal and the second audio signal into a plurality of buffers;
  for each of the buffers:
    computing respective cross-correlations between a portion of the first attacks within the buffer and a portion of the second attacks within the buffer; and
    determining a respective buffer-level delay according to a maximum value of the respective cross-correlations; and
  determining the second delay from the buffer-level delays; and
  adjusting the pre-aligned first audio signal and the second audio signal according to the second delay.

5. The method of claim 4, wherein determining the second delay from the buffer-level delays comprises:
  selecting, from the buffer-level delays, one or more buffer-level delays that correspond to one or more highest cross-correlations between the first attacks and the second attacks among the buffers; and
  designating an average of the selected one or more buffer-level delays as the second delay.

6. The method of claim 4, wherein determining the second delay from the buffer-level delays comprises:
  determining a histogram of the buffer-level delays, the histogram including a plurality of bins, each bin having a bin width corresponding to a pre-specified maximum acceptable misalignment value, each bin containing one or more buffer-level delays having values within the bin width;
  selecting, from the bins, a most popular bin, the most popular bin being a bin in the histogram having a maximum number of buffer-level delays among the bins; and
  designating an average of the buffer-level delays in the most popular bin as the second delay.

7. The method of claim 2, wherein adjusting the alignment of the pre-aligned first audio signal and the second audio signal comprises:
  determining a quality value that indicates estimated quality of the cross-correlations between the first attacks and the second attacks;
  determining whether a first condition for adjusting the alignment is satisfied, the first condition specifying that the quality value shall be greater than a threshold;
  determining whether a second condition for adjusting the alignment is satisfied, the second condition specifying that applying the second delay shall not lead to a cross-correlation value below an original cross-correlation value by more than a specified threshold; and
  adjusting the alignment in response to determining that both the first condition and the second condition are satisfied.

8. The method of claim 7, wherein determining the quality value comprises:
  splitting the pre-aligned first audio signal and the second audio signal into a plurality of buffers;
  for each of the buffers:
    computing respective cross-correlations between a portion of the first attacks within the buffer and a portion of the second attacks within the buffer; and
    determining a respective buffer-level delay according to a maximum value of the respective cross-correlations;
  selecting one or more buffers from the plurality of buffers based on corresponding cross-correlation between attacks; and
  determining the quality value as a ratio between a highest peak of cross-correlation between attacks in the selected one or more buffers and a second highest peak of cross-correlation between attacks in the selected one or more buffers.

9. The method of claim 8, wherein determining whether the second condition is satisfied comprises:
  selecting, from the buffers, a buffer having a highest corresponding cross-correlation between attacks;
  applying the second delay to adjust alignment of the first and second audio signals in the selected buffer;
  computing a waveform-based cross-correlation between the first and second audio signals after applying the second delay;
  computing an envelope of the waveform-based cross-correlation; and
  determining that the second condition is satisfied in response to determining that a value of the envelope is greater than a specified fraction of a maximum value of a cross-correlation computed across the first and second audio signals in an entirety.

10. The method of claim 1, comprising synchronizing a third audio signal with the first audio signal and the second audio signal.

11. The method of claim 10, wherein synchronizing the third audio signal with the first audio signal and the second audio signal comprises:
  designating the first audio signal, the second audio signal, or a combination of the first audio signal and the second audio signal as a reference signal; and
  synchronizing the third audio signal with the reference signal.

12. The method of claim 10, wherein synchronizing the third audio signal with the first audio signal and the second audio signal comprises:
  adding the first audio signal, the second audio signal and the third audio signal to a list;
  recursively performing list reduction actions until all audio signals in the list are synchronized, the list reduction actions comprising:
    selecting two audio signals from the list based on cross-correlation quality;
    synchronizing the selected audio signals; and
    removing at least one of the synchronized audio signals from the list.

13. A system comprising:
  one or more processors; and
  a non-transitory computer-readable medium storing instructions that, when executed by the one or more processors, cause the one or more processors to perform the method of claim 1.

14. A non-transitory computer-readable medium storing instructions that, when executed by one or more processors, cause the one or more processors to perform the method of claim 1.

15. A method comprising: receiving a first audio signal and a second audio signal; determining a first cross-correlation between the first audio signal and the second audio signal based on waveforms of the first audio signal and the second audio signal; determining first attacks of the first audio signal and second attacks of the second audio signal, wherein determining the first attacks and the second attacks comprises determining a first envelope of the first audio signal and a second envelope of the second audio signal, determining the first attacks as positive parts of a mathematical derivative of the first envelope, and determining the second attacks as positive parts of a mathematical derivative of the second envelope; determining a second cross-correlation between the first attacks and the second attacks; synchronizing the first audio signal and the second audio signal by temporally aligning the first audio signal and the second audio signal based on the first and second cross-correlations; synchronizing a third audio signal with the first audio signal and the second audio signal; wherein synchronizing the third audio signal with the first audio signal and the second audio signal comprises: adding the first audio signal, the second audio signal and the third audio signal to a list; recursively performing list reduction actions until all audio signals in the list are synchronized, the list reduction actions comprising: selecting two audio signals from the list based on cross-correlation quality; synchronizing the selected audio signals; and removing at least one of the synchronized audio signals from the list; and providing the synchronized first audio signal, second audio signal, and third audio signal to a consuming device for storage, streaming or playback.

16. A method comprising: receiving a first audio signal and a second audio signal; determining a first cross-correlation between the first audio signal and the second audio signal based on waveforms of the first audio signal and the second audio signal; determining first attacks of the first audio signal and second attacks of the second audio signal, wherein determining the first attacks and the second attacks comprises determining a first envelope of the first audio signal and a second envelope of the second audio signal, determining the first attacks as positive parts of a mathematical derivative of the first envelope, and determining the second attacks as positive parts of a mathematical derivative of the second envelope; determining a second cross-correlation between the first attacks and the second attacks; synchronizing the first audio signal and the second audio signal by temporally aligning the first audio signal and the second audio signal based on the first and second cross-correlations; and providing the aligned first audio signal and second audio signal to a consuming device for storage, streaming or playback; wherein temporally aligning the first audio signal and the second audio signal comprises: pre-aligning the first audio signal and the second audio signal according to a first delay that corresponds to a maximum absolute value of the first cross-correlation between the first audio signal and the second audio signal; and adjusting an alignment of the pre-aligned first audio signal and the second audio signal according to a second delay that corresponds to a maximum value of the second cross-correlation between the first attacks and the second attacks; wherein pre-aligning the first audio signal and the second audio signal comprises: determining that a sign of the first cross-correlation at the maximum absolute value is negative; and inverting one of the first audio signal or the second audio signal.

* * * * *